United States Patent
Lin et al.

(10) Patent No.: US 10,755,477 B2
(45) Date of Patent: Aug. 25, 2020

(54) REAL-TIME FACE 3D RECONSTRUCTION SYSTEM AND METHOD ON MOBILE DEVICE

(71) Applicant: HANGZHOU QU WEI TECHNOLOGY CO., LTD., Hangzhou (CN)

(72) Inventors: Chuanjie Lin, Hangzhou (CN); Jinkuang Zhang, Hangzhou (CN)

(*) Notice: Subject to any disclaimer, the term of this patent is extended or adjusted under 35 U.S.C. 154(b) by 0 days.

(21) Appl. No.: 16/562,459

(22) Filed: Sep. 6, 2019

(65) Prior Publication Data
US 2019/0392634 A1  Dec. 26, 2019

Related U.S. Application Data

(63) Continuation of application No. PCT/CN2019/072069, filed on Jan. 17, 2019.

(30) Foreign Application Priority Data

Oct. 23, 2018  (CN) .......................... 2018 1 1239434

(51) Int. Cl.
*G06T 17/00* (2006.01)
*G06K 9/00* (2006.01)

(52) U.S. Cl.
CPC .......... *G06T 17/00* (2013.01); *G06K 9/00255* (2013.01); *G06K 9/00268* (2013.01)

(58) Field of Classification Search
CPC .............. G06T 17/00; G06K 9/002255; G06K 9/00268
See application file for complete search history.

(56) References Cited

U.S. PATENT DOCUMENTS

| 2018/0253895 A1 | 9/2018 | Arumugam |
| 2019/0228556 A1* | 7/2019 | Wang ........................ G06F 3/01 |

FOREIGN PATENT DOCUMENTS

| CN | 102262788 A | 11/2011 |
| CN | 107392984 A | 11/2017 |
| CN | 108062791 A | 5/2018 |
| CN | 108121950 A | 6/2018 |

OTHER PUBLICATIONS

ISR of PCT/CN2019/072069.

* cited by examiner

*Primary Examiner* — Chong Wu
(74) *Attorney, Agent, or Firm* — HYIP

(57) ABSTRACT

The present invention provides a real-time face 3D reconstruction system on a mobile device, comprising: a data preprocessing module, a face model iteration module and a 3D rendering module. The data preprocessing module is connected to the face model iteration module and transmits data and/or signals to the face model iteration module, and the face model iteration module is connected to the rendering module and transmits data and/or signals to the rendering module. The present invention also provides a real-time face 3D reconstruction method on a mobile device. The present invention only needs an image acquired by a single camera to reconstruct a face model without any manual calibration.

1 Claim, 2 Drawing Sheets

REAL-TIME FACE 3D RECONSTRUCTION SYSTEM AND METHOD ON MOBILE DEVICE

TECHNICAL FIELD

The present invention belongs to the field of video processing, and particularly relates to a real-time face 3D reconstruction system and method on a mobile device.

BACKGROUND

With the popularization of mobile devices and short videos, more and more people edit videos or play games on mobile phones. Some scenes (such as videos or games) require people to create their own avatars and then reconstruct 3D head portraits according to the videos inputted by the camera. On this basis, expressions can be used to manipulate animation models or overlay 3D animation effects. A traditional face reconstruction method needs to shoot multiple photos from different angles or requires a large number of calculations. This requires high requirements for equipment performance and shooting conditions.

SUMMARY

A technical problem to be solved by the present invention is to provide a real-time face 3D reconstruction system and method on a mobile device.

A technical solution adopted to solve the technical problems by the present invention is as follows:

A real-time face 3D reconstruction system on a mobile device comprises: a data preprocessing module, a face model iteration module and a 3D rendering module, wherein the data preprocessing module is used for screening face key points and initializing a face model and parameters;

the face model iteration module is used for conducting iterative computation on face model parameters and camera parameters and generating the face model; and the rendering module is used for rendering a required prop according to the above face model.

The data preprocessing module is connected to the face model iteration module and transmits data and/or signals to the face model iteration module, and the face model iteration module is connected to the rendering module and transmits data and/or signals to the rendering module.

The present invention also provides a real-time face 3D reconstruction method on a mobile device. The method adopts the above system and comprises the following steps:

(1) inputting a face feature point y detected by another face detector, and screening a key point $y_{index\_2d}$;

(2) indicating a face using a deformable model, wherein it is known that the face model transformed by a PCA method is composed of the following parts: a mean model $V_{mean}$, a feature model $V_{basis}$ and an expression model $V_{blend}$; furthermore, defining an unknown feature model parameter $W_{basis}$ and an expression model parameter $W_{blend}$, wherein the dimensions of $W_{basis}$ an $W_{blend}$ are respectively the same as the numbers of $W_{basis}$ and $W_{blend}$; obtaining a face model $V=V_{mean}+W_{basis}*V_{basis}+W_{blend}*V_{blend}$; making partial points $V_{index\_3d}$ with an index of index_3d in the model and the face key points $y_{index\_2d}$ in one-to-one correspondence;

(3) stimating a camera matrix P using a Gold Standard algorithm for the face key point $y_{index\_2d}$ and the current model V to minimize $\Sigma_i\|y_i-P(V_i)\|^2$; $y_i \in y_{index\_2d}$ and $V_i \in V_{index\_3d}$;

(4) updating a model edge point under a current camera projection; firstly, calculating a normal vector $\vec{V}$ of all vertexes V in the model; setting a line-of-sight vector as $\vec{m}$; judging whether $V_i$ is an edge point according to vector dot product $a=\vec{V}_i \cdot p^{-1} \cdot \vec{m}$ under the current camera matrix P, so as to find an edge H, wherein $\vec{V}_i \in \vec{V}$; and comparing a point in H with the edge point in $y_{index\_2d}$ to obtain a closest point of various key points and update $V_{index\_3d}$;

(5) calculating the feature model parameter and a shape model parameter to minimize $\Sigma_i\|y_i-P(V_{mean}+\Sigma(W_{basis}*V_{basis})+(W_{blend}*V_{blend})_i\|^2$, and calculating the current model V; and (6) repeating steps (3)-(5), and iterating for two to three times to obtain a final parameter $E(P_i W_{basis}, W_{blend})$ and model V.

The present invention has the following beneficial effects;

(1) The present invention only needs an image acquired by a single camera to reconstruct the face model without any manual calibration.

(2) The model adopted by the present invention can accurately describe face expressions in real time.

(3) The face 3D model obtained by the system and the method of the present invention can realize the functions of 3D stickers, face masks, expression driving models, etc.

DETAILED DESCRIPTION

Figure 1:
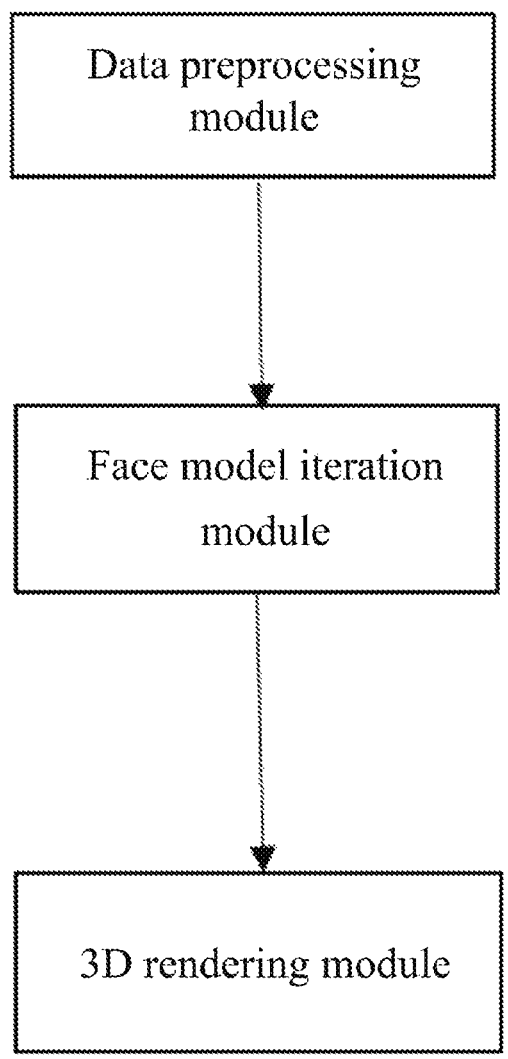
FIG. 1 is a system architecture diagram of the present invention.
Figure 2:
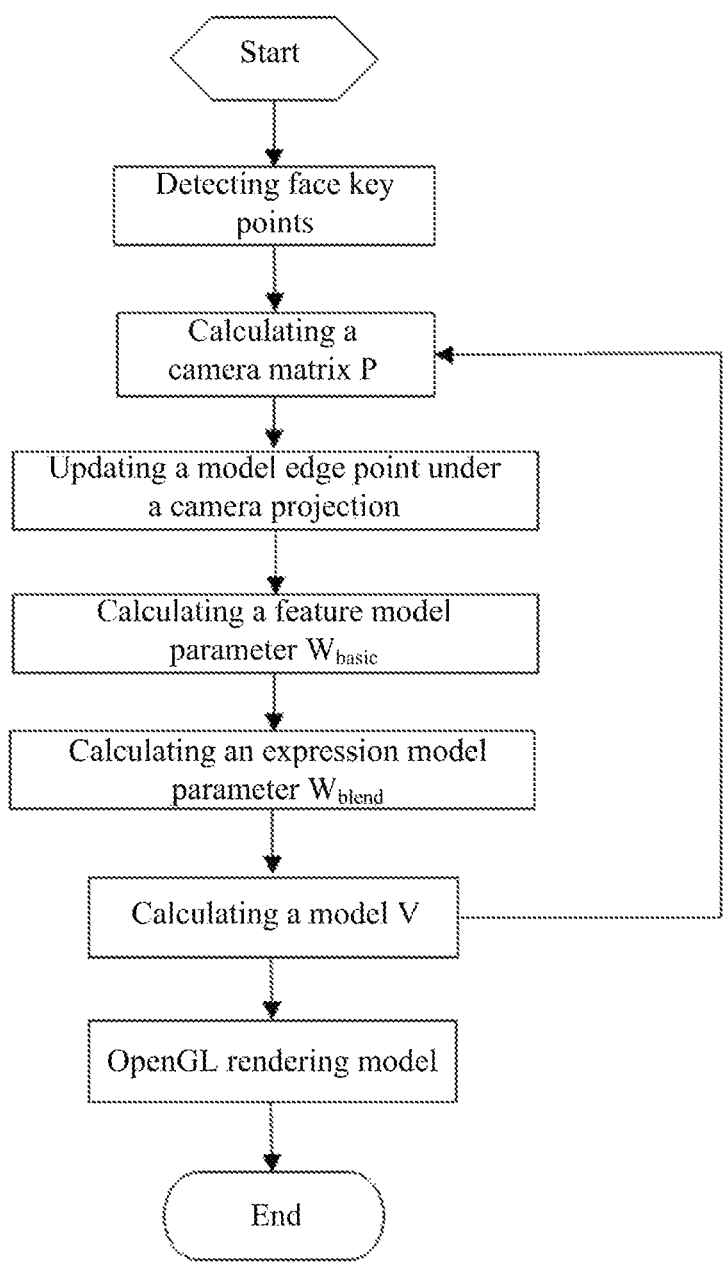
FIG. 2 is a flow chart of face 3D reconstruction processing.

The technical solution of the present invention will be further explained below in detail in combination with drawings. It should be noted that the detailed description is only a detailed description of the present invention and should not be regarded as a limitation of the present invention.

A real-time face 3D reconstruction system on a mobile device in the present invention comprises:

a data preprocessing module, a face model iteration module and a 3D rendering module, wherein the data preprocessing module is used for screening face key points and initializing a face model and parameters;

the face model iteration module is used for conducting iterative computation on face model parameters and camera parameters and generating the face model; and the rendering module is used for rendering a required prop according to the above face model.

The connection relationship among the three modules is: the data preprocessing module is connected to the face model iteration module and tranguits data and/or signals to the face model iteration module, and the face model iteration module is connected to the rendering module and transmits data and/or signals to the rendering module.

A real-time face 3D reconstruction method on a mobile device in the present invention adopts the above system and comprises the following steps:

(1) inputting a face feature pointy detected by another detector, and screening a key point $y_{index\_2d}$;

(2) indicating a face using a deformable model which comprises a mean model $V_{mean}$, a feature model $V_{basis}$ and an expression model $V_{blend}$, and then defining an unknown feature model parameter $W_{basis}$ and an expression model parameter $W_{blend}$; parameter dimensions being the same as the number of models; obtaining a face model $V=V_{mean}+W_{basis}*V_{basis}+W_{blend}*V_{blend}$ making partial points $V_{index\_3d}$ with an index of index_3d in the model and the face key points $y_{index\_2d}$ in one-to-one correspondence;

(3) stimating a camera matrix P using a Gold Standard algorithm for the face key point $y_{index\_2d}$ and the current model V to minimize $\Sigma_i\|y_i-P(V_i)\|^2$, wherein $y_i \in y_{index\_2d}$ and $V_i \in V_{index\_3d}$ and $y_i$ indicates the ith key point, $V_i$ indicates a model of the ith key point $y_i$, and $P(V_i)$ is a matrix of $V_i$;

(4) updating a model edge point under a current camera projection for a case of non-front face, wherein it is known according to characteristics of the face model that if an included angle between an observation line of sight and a vertex normal vector is smaller, the vertex is more likely to be on the current edge; calculating a normal vector $\vec{V}$ of all vertexes V in the model; setting a line-of-sight vector as $\vec{m}$; judging whether $V_i$ is an edge point according to vector dot product $a=\vec{V}_i \cdot P^{-1} \cdot \vec{m}$ under the current camera matrix P, so as to find an edge H, wherein $\vec{V}_i \in \vec{V}$; and comparing a point in H with the edge point in $y_{index\_2d}$ to obtain a closest point of various key points and update $V_{index\_3d}$;

(5) calculating the feature model parameter and a shape model parameter to minimize $\Sigma_i\|y_i-P(V_{mean}+\Sigma(W_{basis}*V_{basis})+(W_{blend}*V_{blend})_i\|^2$, and calculating the current model V; and (6) repeating steps (3)-(5), and iterating for two to five times to obtain a final parameter $E(P,W_{basis}, W_{blend})$ and model V.

A flow for face 3D reconstruction processing is shown in FIG. 1, and comprises the following steps:)

1) selecting a 3D sticker or mask in a shooting mode of a mobile phone video app;

2) loading a PCA face model and initializing by a 3D face reconstruction module of the app;

3) conducting, by another module, face detection on an image acqui red by a camera; acquiring a group of face feature points if a face exists; and screening a key point Y;

4) estimating a simple projection camera matrix P through a least square method according to the face key point Y and a corresponding key point in the PCA face model using a Gold Stand algolithm so as to find a displacement t, rotation r, scale s, etc.;

5) finding a model edge according to the normal vector of the model vertexes; comparing a point at the edge with Y; and updating the model edge point and the model key point;

6) updating the model parameters and $W_{basis}$ and $W_{blend}$ through the least square method according to the face feature point Y and the model, key point V;

7) iterating for 2-3 times in the application to obtain a good result, and calculating the current face model;

8) transmitting the face model to a rendering engine by using an OpenGL rendering model to provide shielding information for other 3D models (such as 3D sticker model, etc) or drawing a face mask; and 9) finally, rendering required models together to a screen.

The invention claimed is:

1. A real-time face 3D reconstruction method on a mobile device, comprising the following steps:

(1) conducting face detection on an image in a camera to obtain a key point $y_{index\_2d}$;

(2) indicating a face using a deformable model which comprises a mean model $V_{mean}$, a feature model $V_{basis}$ and an expression model $V_{blend}$, and then defining a feature model parameter $W_{basis}$ and an expression model parameter $W_{blend}$; obtaining a face model $V=V_{mean}+W_{basis}*V_{basis}+W_{blend}*V_{blend}$ partial points $V_{index\_3d}$ with an index of index_3d in the model and the face key points $y_{index\_2d}$ in one-to-one correspondence;

(3) minimizing $\Sigma_i\|y_i-P(V_i)\|^2$ for the key point $y_{index\_2d}$ and the current model V to calculate a camera matrix P;

(4) updating a model edge point under a current camera projection for a case of non-front face; firstly, calculating a normal vector $\vec{V}$ of all vertexes V in the model; setting a line-of-sight vector as $\vec{m}$; judging whether $V_i$ is an edge point according to vector dot product $a=\vec{V}_i \cdot P^{-1} \cdot \vec{m}$ under the current camera matrix P, so as to find an edge H, wherein $\vec{V}_i \in \vec{V}$; and comparing a point in H with the edge point in $y_{index\_2d}$ to obtain a closest point of various key points and update $V_{index\_3d}$;

(5) calculating the feature model parameter and a shape model parameter to minimize $\Sigma_i\|y_i-P(V_{mean}+\Sigma(W_{basis}*Y_{basis})+(W_{blend}*V_{blend})_i\|^2$, and calculating the current model V: and (6) repeating steps (3)-(5), and iterating for two to five times to obtain a final parameter $W(P, W_{basis}, W_{blend})$ and model V.

* * * * *